United States Patent [19]
Kato

[11] Patent Number: 4,865,512
[45] Date of Patent: Sep. 12, 1989

[54] INDUSTRIAL ROBOT ADJUSTMENT DEVICE

[75] Inventor: Hisao Kato, Aichi, Japan

[73] Assignee: Mitsubishi Denki Kabushiki Kaisha, Tokyo, Japan

[21] Appl. No.: 181,952

[22] Filed: Apr. 15, 1988

[30] Foreign Application Priority Data

Apr. 15, 1987 [JP] Japan .................................... 62-92775

[51] Int. Cl.$^4$ .............................................. B25J 9/22
[52] U.S. Cl. ........................................ 414/680; 901/2; 901/46
[58] Field of Search ...................... 414/680, 729, 730; 901/4, 5, 9, 2, 15, 46, 50; 244/161

[56] References Cited

U.S. PATENT DOCUMENTS

| | | | |
|---|---|---|---|
| 4,295,740 | 10/1981 | Sturgis, Jr. | 244/161 X |
| 4,372,721 | 2/1983 | Harjar et al. | 901/4 X |
| 4,627,785 | 12/1986 | Monforte | 414/730 |

Primary Examiner—Robert J. Spar
Assistant Examiner—Donald W. Underwood
Attorney, Agent, or Firm—Sughrue, Mion, Zinn, Macpeak & Seas

[57] ABSTRACT

An industrial robot adjustment device capable of adjusting the position of a tip end of an industrial robot easily to the origin assumed by software of the industrial robot. The adjustment is electrically carried out by the coupling of a jig positioned at a predetermined position relative to the robot and pins provided to a flange which is detachably mounted on an end portion of an operating arm of the robot.

12 Claims, 3 Drawing Sheets

INDUSTRIAL ROBOT ADJUSTMENT DEVICE

BACKGROUND OF THE INVENTION

The present invention relates to an industrial robot adjustment device capable of adjusting the position of a tip end of an industrial robot easily to the origin assumed by software of the industrial robot.

In conventional robot systems, absolute X and Y axes assumed by the software used for driving the robot are set in fixed directions with respect to the robot body. To ensure effective MDI (Manual Data Input) operations, the robot should be mounted to a processing machine such as a lathe or other processing machine with which the robot is employed, in such a manner that the X and Y axes of the machine and the X and Y axes assumed by the software are accurately aligned. (See, for example, Published Examined Japanese Patent Application No. 21362/1980). (The MDI operations involve entering the values for the directions of the X and Y axes with respect to the robot, and the X and Y dimensions, and moving the robot to the required positions).

However, it is generally the case that the direction of the X and Y axes of the software are not indicated on the body of the robot. Moreover, the bolt-holes provided for attaching the robot to the attachment base of the lathe or the like allow a certain degree of slack, and hence it is not always the case that the X and Y axes of the software and the X and Y axes of the processing machine are correctly aligned with each other. When there occurs such misalignment of the X and Y axes of the software and the X and Y axes of the processing machine, the movements of the robot may interfere with the processing machine, and thus there is the danger of damage to either or both of these assemblies.

In order to solve the above described difficulties accompanying the conventional device, an industrial robot adjustment device has been proposed, in which the tip-end portion of arms of an industrial robot is positioned at the end portion of a jig that has been positioned and installed at a fixed position relative to the X and Y axes of the processing machine in advance, and the position of the tip-end portion thereof is taken as the point of origin for the MDI operations.

FIGS. 1 to 3 show an example of such an industrial robot adjustment device capable of adjusting the tip-end portion of the robot to the origin of the software programmed for the robot device. In the figures, (1) designates a robot base fixedly mounted on an installation base (2) of a processing machine. (3) designates a robot body provided to the robot base (1) in such a manner that the body 3 is allowed to rotate in the direction indicated by an arrow $\theta_1$. (4) is a first arm which is mounted on the robot body (3) in such a manner that the first arm (4) is allowed to swing in a direction $\theta_2$, (5) is a second arm which is mounted at the upper end of the first arm (4) in such a manner that the second arm (5) is allowed to swing in a direction $\theta_3$, (6) is a third arm which is mounted on the tip end of the second arm (5) in such a manner that the third arm (5) is allowed to rotate in a direction $\theta_4$, (7) is a tip-end member which is mounted on the third arm (5) in such a manner that the tip-end member (7) is allowed to swing in a direction $\theta_5$ and (8) is a flange which is detachably mounted at the lower end of the tip-end member (7) in such a manner that the flange (8) is allowed to rotate in a direction $\theta_6$. Accordingly, the industrial robot shown in FIG. 1 is a six-axes type industrial robot having six-degrees of freedom. (10) designates a jig which is fixed on the installation base (2) with an end portion of the jig (10) in close contact with a reference surface of the robot base (1). Further, the jig (10) is positioned at a predetermined position relative to the processing machine. Dimensions A and B thereof are determined to specific values in advance and so the upper end surface of the jig (10) is located at a predetermined set position. (11) denotes three pins of the same shape and dimensions, which are planted on the tip-end surface of the flange (8) and are arranged at equal intervals on the periphery of a circle centering on a rotation axis (9) of the flange (8). (12) denotes three pins that are planted on the upper end surface of the jig (10) in correspondence with the pins 11.

With such an industrial robot adjustment device as shown in FIG. 1, the robot is actuated so that the pins (11) on the flange (8) are accurately positioned to the respective pins (12) on the jig (10) and then the position of the robot is determined as the point of origin for MDI adjustment. In this case, however, in order to check the contact between the pins (11) and the pins (12), it is necessary for an operator who is responsible for achieving measurements to enter the robot's work envelope, which is dangerous. In addition the precision of checking of the state of contact is relatively poor since the checking is done visually. It is also disadvantageous in that since adjustment is effected through the contact of the pins (11) and (12) that have the same shape and dimensions, there is risk of misadjustment to a position that is displaced by a 120° or 240° turn relative to the rotation axis (9).

SUMMARY OF THE INVENTION

In order to solve such problems as described above, an object of the present invention is to provide an industrial robot adjustment device capable of readily adjusting the position of a tip end of an arm of the robot to a point of origin in the software with accuracy and without danger to operators and capable of eliminating misadjustment to positions that are rotationally displaced with respect to a rotation axis of the tip-end.

The above and, other objects of the present invention are accomplished by the provision of an industrial robot adjustment device for an industrial robot having at least one operating arm comprising: a first member having at least three protrusions, which is detachably mounted to an end portion of said arm in such a manner that said first member is allowed to rotate about a rotation axis; a second member disposed at a predetermined position relative to said industrial robot, said second member being provided with at least three holes adapted to receive said protrusions corresponding thereto; and means for detecting insertion of said protrusions into said receiving holes to produce a detection signal; the position of the rotation axis when the detection signal is produced, being taken as the point of origin for manual data input (MDI) adjustment for said industrial robot.

DETAILED DESCRIPTION OF THE INVENTION

Figure 1:
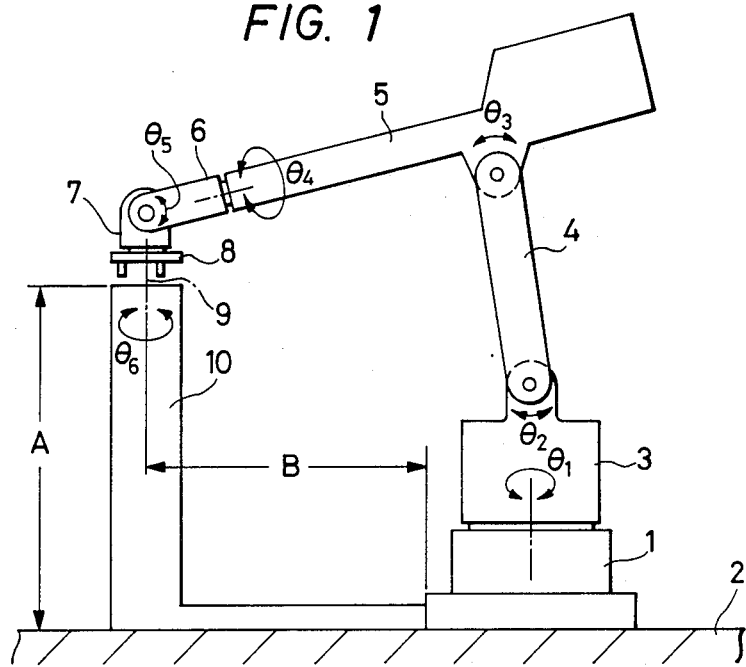
FIG. 1 is a schematic diagram illustrating a side view of an industrial robot adjustment device.
Figure 2:
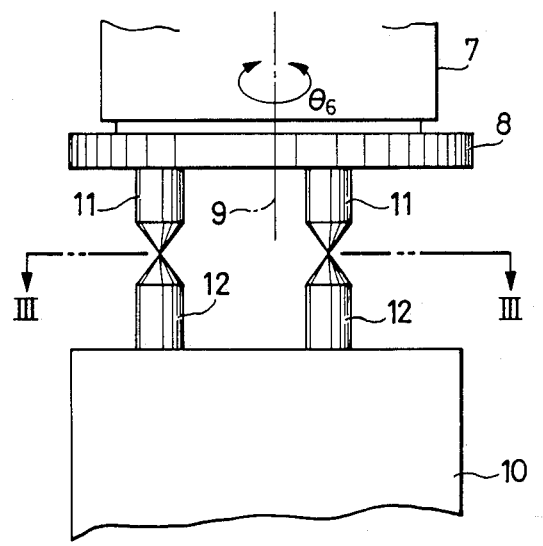
FIG. 2 is an enlarged view of a portion of the device shown in FIG. 1.
Figure 3:
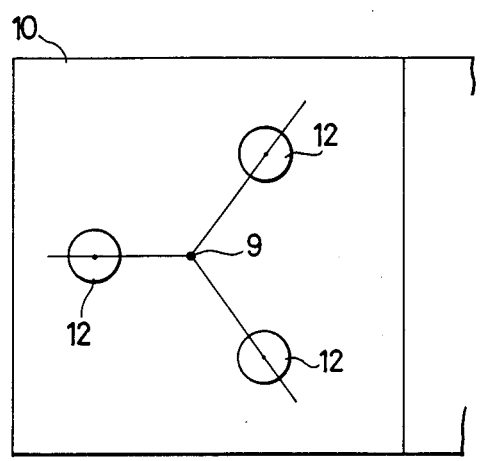
FIG. 3 is a schematic diagram showing a view taken along a line III—III of FIG. 2.
Figure 4:
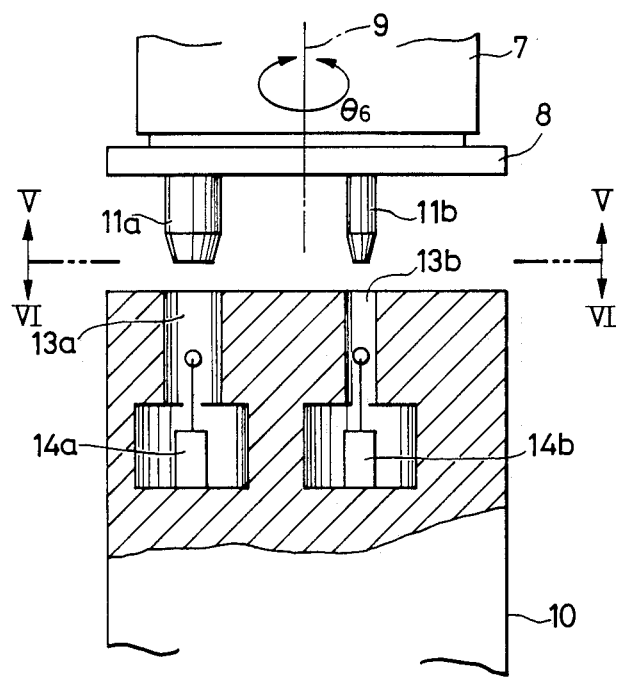
FIG. 4 is a diagram illustrating a part of an industrial robot adjustment device according to the present invention in detail.
Figure 5:
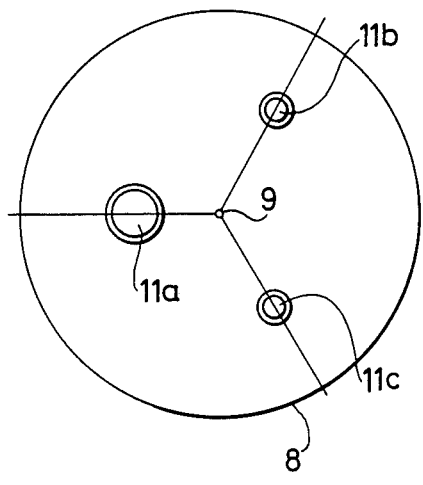
FIG. 5 is a schematic diagram showing a view taken along a line V—V of FIG. 4.
Figure 6:
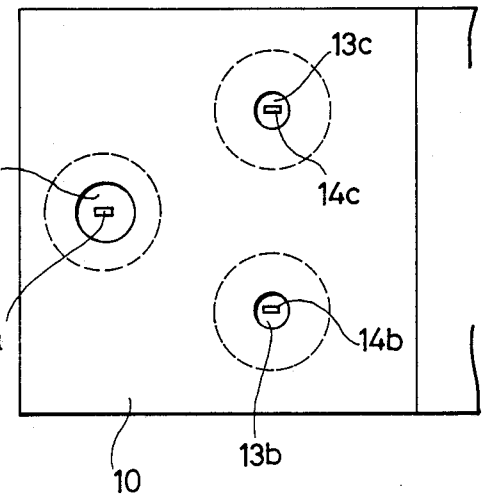
FIG. 6 is a schematic diagram showing a view taken along a line VI—VI of FIG. 4.
Figure 7:
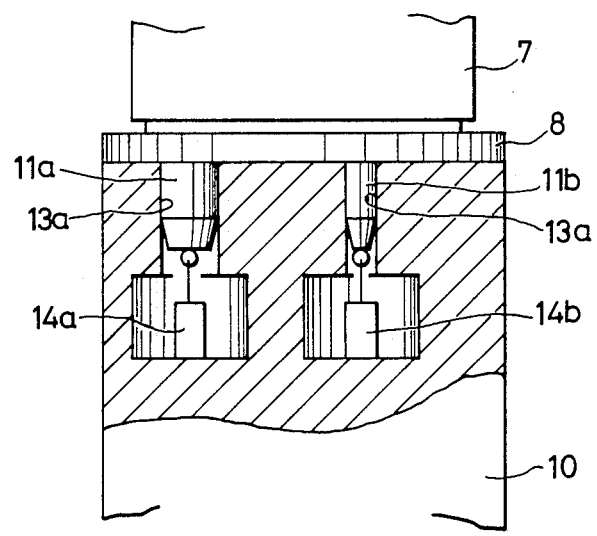
FIG. 7 is a schematic diagram illustrating a side view of the present device including a cut-away portion.

An embodiment of the present invention is shown in FIGS. 4–7, in which reference numbers which are the same as in FIGS. 1–3 indicate the same or corresponding parts. (11a), (11b) and (11c) are three pins which are planted on a flange (8). The pins (11a) to (11c) are disposed at equal intervals on the periphery of a circle centering on a rotation axis 9 of the flange (8). In order to prevent incorrect insertion, one of the pins (11a) is shaped to have a diameter larger than those of the other two pins (11b) and (11c). (13a), (13b) and (13c) are fitting holes that are provided in the tip-end surface of a jig 10 in correspondence to the pins (11a), (11b) and (11c). The fitting hole (13a) is adapted to receive the pin (11a) whereas the fitting holes (13b) and (13c) are adapted to receive the pins (11b) and (11c), respectively. The jig (10) is positioned at a position having a certain relation to X and Y axes of a robot body and those of a processing machine. With such a construction, the fitting in other positions is impossible whereby incorrect insertion is prevented. (14a), (14b) and (14c) are pin detectors which are respectively provided in the bottoms of the fitting holes (13a), (13b) and (13c). The pin detectors (14a), (14b) and (14c) are actuated to output a detection signal when the corresponding pins (11a), (11b) and (11c) are inserted into the respective fitting holes (13a), (13b) and (13c).

To adjust the rotation shaft 9 of the flange (8) to the point of origin of the software in an industrial robot adjustment device, first the robot is actuated so as to insert the pins (11a), (11b) and (11c) into the corresponding fitting holes (13a), (13b) and (13c) in the jig (10), respectively. In this process, incorrect insertion is prevented and there is no risk of adjustment to a position that is rotationally displaced with respect to the rotation axis (9) since only pin (11a) out of pins (11a), (11b) and (11c) has a large diameter and holes (13a), (13b) and (13c) are set with inner diameters corresponding to the pin diameters.

When pins the (11a), (11b) and (11c) are inserted into the corresponding fitting holes (13a), (13b) and (13c), the pin detectors (14a), (14b) and (14c) in the fitting holes (13a), (13b) and (13c) are actuated by contact with the pins (11a), (11b) and (11c) to produce the detection signal. In response to the detection signal, the operator responsible for measurements sets the position of the robot at that time to be at the point of origin for MDI adjustment.

Although incorrect insertion is prevented by making just pin (11a) larger in diameter in the above described embodiment, the same function may also be obtained in another manner, e.g., by making just pin (11a) different in shape, i.e., a prism, etc. Also, the insertion of the pins (11a), (11b) and (11c) into the fitting holes (13a), (13b) and (13c) is not limited to being in the vertical direction but the pins may also be inserted horizontally or in a slanting direction.

It should be noted that the invention can be equally applied to not only a vertical joint type robot described above but also to a horizontal joint type robot.

According to the present invention, a robot is first operated so that projections provided at a tip-end portion of its arm are inserted into specific respective holes in a jig positioned at a position having a certain relation to X and Y-axes of a robot body and processing machine. As a result, projection detectors provided in the holes are thus actuated so that this position is taken as the point of origin for MDI adjustment. Consequently, it is possible to achieve adjustment between the X and Y-axes of the software and the X and Y-axes of the processing machine easily and accurately.

Since the point of origin for MDI adjustment is confirmed by actuation of the projection detectors in this process, remote measurement is possible and measurement can be effected easily and with a high degree of precision but without any accompanying danger. Further, incorrect insertion is prevented and there is no risk of adjustment to a position that is rotationally displaced with respect to the rotation axis of a tip-end since the projections have constructions such that they can only be inserted into specific holes.

What is claimed is:

1. An industrial robot adjusting device for an industrial robot having at least one operating arm, comprising:

a first member having at least three protrusions, which is detachably mounted to an end portion of said arm in such a manner that said first member is allowed to rotate about a rotation axis; a second member positioned at a predetermined position relative to said industrial robot, said second member being provided with a least three holes adapted to receive said protrusions corresponding thereto; and means for detecting insertion of said protrusions into said receiving holes to produce a detection signal said detecting means being respectively provided in a bottom portion of each of said holes such that said detection signal is produced upon contact with said protrusions; the position of the rotation axis when the detection signal is produced, being taken as the point of origin for manual data input (MDI) adjustment for said industrial robot.

2. The device of claim 1 wherein said protrusions are arranged on the periphery of a circle centering on the rotation axis, and one of said protrusions is different in size from the remaining protrusions.

3. The device of claim 2 wherein said protrusions are arranged at equal intervals on the periphery thereof.

4. The device of claim 1 wherein said protrusions are cylindrical pins, respectively.

5. The device of claim 2 wherein said protrusions are cylindrical pins, respectively.

6. The device of claim 3 wherein said protrusions are cylindrical pins, respectively.

7. The device of claim 4 wherein one of said pins has a diameter larger than those of the other pins.

8. The device of claim 5 wherein one of said pins has a diameter larger than those of the other pins.

9. The device of claim 6 wherein one of said pins has a diameter larger than those of the other pins.

10. The device of claim 2 wherein one of said protrusions is a prism-shaped pin and the other protrusions are cylindrical pins.

11. The device of claim 1 wherein said industrial robot is of a vertical joint type.

12. The device of claim 1 wherein said protrusions are arranged on the periphery of a circle centering on the rotation axis, and one of said protrusions is different in shape from the remaining protrusions.

* * * * *